Jan. 27, 1953         F. A. HANSEN         2,626,784
MILK COOLER
Filed May 2, 1949
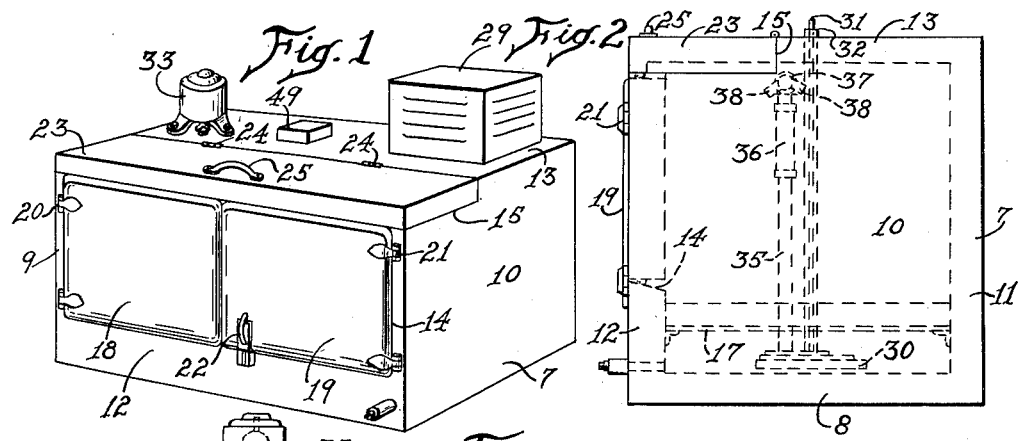
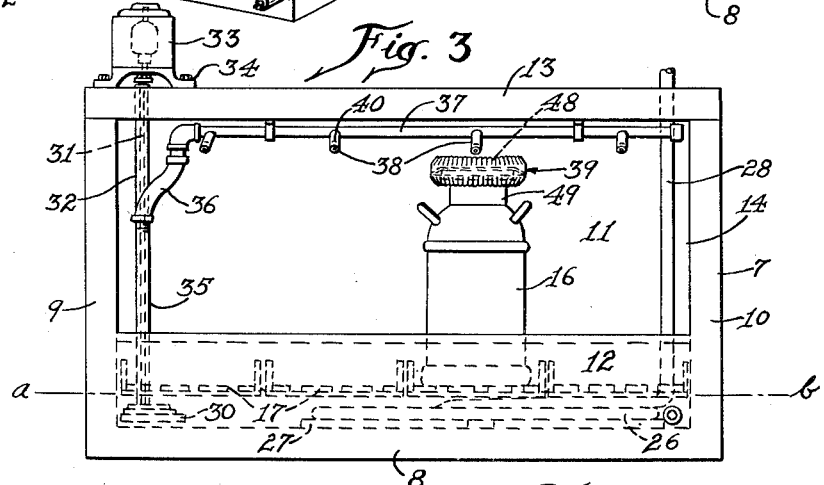
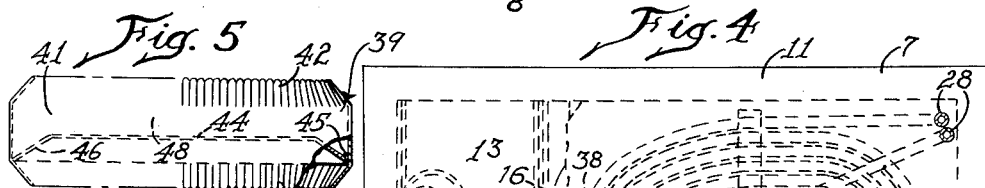
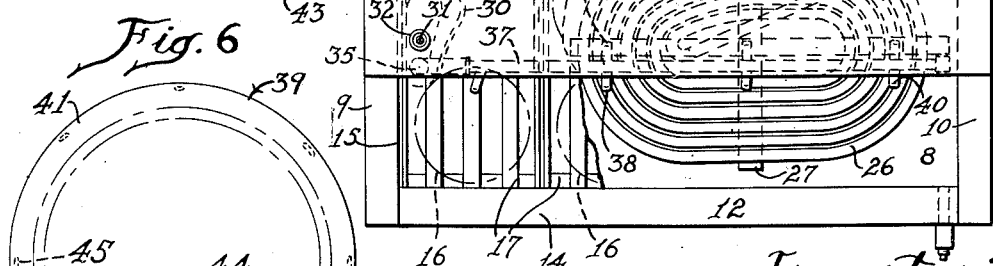
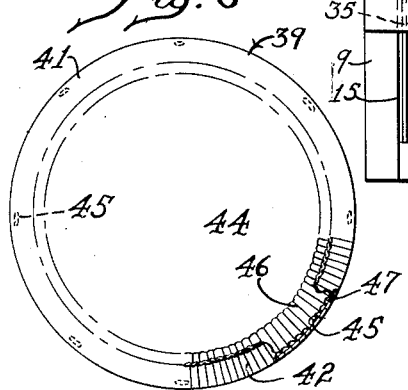
Inventor:
Fred A. Hansen
Andrew F. Wintercorn
Atty.

Patented Jan. 27, 1953

2,626,784

UNITED STATES PATENT OFFICE 2,626,784

MILK COOLER

Fred A. Hansen, Fond du Lac, Wis.

Application May 2, 1949, Serial No. 90,876

2 Claims. (Cl. 257—189)

This invention relates to a new and improved milk cooler.

Promptly after milking, it is important that the dairyman cool the milk down to fifty degrees Fahrenheit (50° F.) or lower and thereafter to keep the milk at a reasonably low temperature, so as to keep the bacteria count low and well within specified requirements. Milk cooling cabinets have been available for this purpose using electrical refrigeration apparatus, to furnish the supply of ice water, and various designs of cabinets to house the milk cans containing the milk to be cooled, the cabinets having various designs of apparatus for circulating and/or spraying the ice water around and onto the cans to cool the contents thereof. Most of the water circulating and/or spraying apparatus heretofore available in milk cooling cabinets have been objectionable from that standpoint that there was entirely too much splashing of water in the spraying at high velocities, so that the water did not completely envelop the cans for efficient cooling. These apparatuses also were not designed to avoid clogging of pipes and nozzles with the inevitable straw, dirt, and sediment washed off the cans placed in the cabinet. It is, therefore, the principal object of my invention to avoid those difficulties by the provision of water distributing devices applicable over the necks of the cans, designed to handle a large volume of water but discharge it in a thick film completely enveloping the cans from top to bottom, entirely without splashing, the distributing devices serving to trap any trash that might be washed off the cans and circulated by the pump through the piping to the top discharge manifold, which has discharge pipes extending therefrom to the various can stations for discharge into the distributing devices, the water circulating system being devoid of any small orifices apt to become clogged and being, instead, designed to allow passage therethrough of the foreign particles, so that they may be caught in the distributing devices, which can be readily cleaned after each use.

The invention is illustrated in the accompanying drawing, in which—

Fig. 1 is a perspective view of a milk cooling cabinet adapted for using the improved water distributing devices made in accordance with my invention;

Fig. 2 is an end view, some of the structural details of the cabinet as well as of the cooling apparatus being indicated in dotted lines;

Fig. 3 is a front view with all of the doors removed from the cabinet and showing how the cans are adapted to be set in the cabinet with the water distributing devices thereon, this view also including a showing in dotted lines of the cooling coil below the can-supporting racks, and also a dotted line showing of the water circulating pump and its connection with the top discharge manifold;

Fig. 4 is a top view of Fig. 3 with certain of the can-supporting racks broken away to disclose the cooling coil therebeneath, and Figs. 5 and 6 are two views of one of the water distributing devices, shown on a larger scale.

The same reference numerals are applied to corresponding parts throughout the views.

Referring to the drawing, the reference numeral 7 designates a suitably insulated generally rectangular cabinet providing a bottom wall 8, full height opposed side walls 9 and 10, full height rear wall 11, full length partial height front wall 12, and full length partial width top wall 13, whereby the front has an opening 14 its full length to about two-thirds the depth of the cabinet, and a top opening 15 extending the full length of the cabinet nearly half the way back from the front wall, whereby to allow easy removal and replacement of milk cans like that shown at 16, the cans being easily accessible from the front of the cabinet, and being easily slid one way or the other on the racks 17 that are provided therefor in the lower portion of the cabinet in elevated relation to the bottom wall 8, but below the top edge of the front wall 12, as indicated in Fig. 3. Two front doors 18 and 19 are hinged, as at 20 and 21, to the end walls 9 and 10 of the cabinet, and have their adjoining rabbeted ends overlapped so that a single hand operable latch 22 on the door 19 serves to fasten the two doors. A full length top closure 23, hinged at 24 to the top wall 13, closes the top opening 15, a handle 25 being provided on this top closure to raise and lower the same. The absence of any middle mullion between the two doors plus the full length top opening makes for easy removal and replacement of cans. The cabinet shown will accommodate seven regulation size milk cans 16, two on each of the three full-width racks 17 and one on the half-width fourth rack at the left hand end of the cabinet. However, cabinets of larger and also smaller capacity may be provided.

A water level is maintained in the bottom of the cabinet just below the racks 17, as indicated by the line a—b in Fig. 3, and a cooling coil 26 is provided in the bottom of the cabinet below the racks supported in spaced relation to the bottom wall 8 by a cross-shaped frame 27, to insure good circulation of water around this coil.

Any suitable or preferred refrigeration apparatus may be provided connected with the ends 28 of the coil 26, which are shown as extending upwardly in one end of the cabinet for connection with an apparatus in the housing 29 on top of the cabinet, but, of course, any other suitable or preferred arrangement may be provided. A sump pump 30 driven by a shaft 31 that extends downwardly to the pump through a tube 32 is suitably connected with the armature shaft of an electric motor 33 mounted to operate on a vertical axis on top of the cabinet, as indicated at 34 in Fig. 3. Pump 30 is at the far end of the cabinet away from the coil 26, so that its intake will be assured of receiving an ample supply of ice water, regardless of the size of the ice coating on the coil 26. This pump 30 has its discharge pipe 35 extending upwardly therefrom and connected, as indicated at 36, with a longitudinally extending manifold 37 suitably supported in the top of the cabinet on the longitudinal centerline thereof. Seven discharge nipples 38 extend forwardly and rearwardly from the manifold 37 and are directed downwardly at an acute angle to discharge the ice water approximately into the centers of the water distributing devices 39 that are placed like caps on the necks of the cans 16. The devices 39, the construction of which will be more fully described presently, serve principally to cause the water to flow downwardly over the cans at low velocity and in a thick film, so as to completely envelop the cans from top to bottom for most efficient cooling, but they are also designed to serve a secondary purpose, namely, as strainers to catch and retain therein any particles of trash, dirt, and sediment washed off the cans and carried in the ice water pumped through the circulating system by the pump 30. This circulating system, it will now be noticed, is devoid of any small orifices, the pipes 35—37 being large enough to allow free passage of the foreign particles therethrough with the water, and the nipples 38 also having large enough bores to reduce to a minimum any likelihood of their being clogged by such particles. The trash and dirt collected in the water distributing devices 39 can easily be cleaned out between uses. The location of the manifold 37 in the extreme top portion of the cabinet is of advantage because that, together with the open front and open top construction of the cabinet, leaves the way clear to move the cans easily into and out of the cabinet without danger of damaging cans as well as the nozzles that might otherwise be struck by the cans, besides greatly reducing likelihood of injury to the workman's hands in handling the cans. Also, because of the large amount of water circulated with my improved system and the novel combination disclosed, there is avoided the necessity for any complicated baffles and other devices to insure proper circulation of the water over the ice bank or cooling coil after it has been passed over the cans. The water is circulated so fast in the present cooler that it is brought repeatedly into contact with the ice formation every time the pump 30 is operated. The racks 17 are of skeleton construction, so that the water will circulate freely through the same into contact with the ice bank around the coil 26. The water distributing devices 39, besides serving the two functions already mentioned, serve to prevent splashing as they catch and retain all of the water discharged in large volume and at high velocity from nipples 38, the water distributing devices then directing the water gently downwardly in a thick film onto the necks of the cans for complete envelopment of the cans from top to bottom. If desired, the nipples 38 may have air entraining slots provided therein, as indicated at 40, such slots being now commonly provided on non-splash kitchen sink faucets, whereby to further reduce splashing in the present cooler and thereby proportionately increase cooling efficiency, it being recognized that water discharged in jets or splashed against a can only splashes away again instead of running down the surface thereof.

Referring to Figs. 5 and 6, it will be seen that the water distributing devices 39 are each made from two pieces of sheet metal, preferably galvanized to prevent rusting, there being a ring-shaped body 41 with radially crimped and tapered top and bottom portions 42 and 43, and a circular disk 44 fitting closely inside and welded or soldered at circumferentially spaced points, as at 45, to the ring 41 intermediate the ends thereof and in a plane normal to the axis thereof, said disk having its marginal edge portion 46 radially crimped, like portions 42 and 43, and bent downwardly, so as to leave a multiplicity of small openings 47 between the scallops defined on the peripheral edge of the disk's crimped portion and the inside of the ring 41, through which the water pocketed in the reservoir or receptacle 48 formed in ring 41 above the disk 44 will be discharged gently in that many small streams downwardly on the inside of the ring and in the corrugations in the crimped lower edge portion 43, so as to be directed, without splashing, onto the neck portion 49 of the can 16. The inward inclination of the top portion 42 is also important from the standpoint of retaining all of the water caught in receptacle 48 from the associated nipple 38, the inward inclination preventing the water from welling up over the side away from the nipple 38. The closely spaced small streams of water from openings 47 and registering corrugations 43 merge when they come into contact with the neck of the can to form the thick film of cold water mentioned before as enveloping the can from top to bottom. This method of circulation and distribution of the ice water is novel and makes for quicker cooling of the milk than previous methods, as tests have definitely proved. When a distributing device 39 is in place properly on top of a can, there is no danger of any of the cold water getting into the milk even if the usual can cap or cover is left off.

In operation, the electric motor 33 for the pump 30 is controlled by a timing switch 49, and a thermostat (not shown) controls the operation of the refrigeration unit at 29. During initial cooling, right after the cans of milk have been placed in the cooler, the pump 30 is operated continuously for about one hour, whereby to get the milk cooled down to a temperature of fifty degrees Fahrenheit (50° F.) or less, which is the temperature usually prescribed by law. The coil 26 keeps the water at a temperature of about thirty-three degrees (33°) to thirty-five degrees Fahrenheit (35° F.), as regulated by the thermostat mentioned. To prevent the milk warming up during the night, the timer switch 49 throws the motor 33 into operation to operate the pump 30 about two minutes each hour for the next eleven hours. During the day, when there are no cans in the cooler, the pump 30 will not be operated at all. The present system of cooling is more positive and trouble-free than those relying solely upon thermostats and other controls. The sump below the racks 17 is mainly for the formation of a sizeable ice bank and not so much for storage of that much water, as my system operates most efficiently with a small amount of water. The cooling coil 26 is so designed and arranged that there is no danger of ice forming at or near the pump 30. With my cooler there is no need for milk agitators or stirring devices, due to the rapidity of cooling. This insures cleaner milk and a lower bacteria count, it being well known that stirring devices should be thoroughly sterilized after each use, whereas that is seldom done by the average farmer, with the result that otherwise pure milk may become contaminated even though it has been properly cooled. It is, therefore, important to operate a cooler, as here, with the cans kept completely covered at all times.

It is believed the foregoing description conveys a good understanding of the objects and advantages of my invention. The appended claims have been drawn to cover all legitimate modifications and adaptations.

I claim:

1. A fluid distributing device adapted to be applied to a filled can having an upper necked filler opening portion to effect heat exchange between the contents of the can and the fluid distributed over and running down by gravity on the external surface of the can, said device comprising a sheet metal ring, the lower edge portion of said ring being crimped radially and tapered inwardly along its entire periphery to establish an inwardly tapered array of closely spaced radial corrugations, and an imperforate circular sheet metal plate of substantially the same diameter as the inner diameter of said ring above the corrugated portion secured to and extending transversely of said ring intermediate the upper and lower edge portions to thereby establish therein a receptacle for fluid above said plate and a fluid distributing portion below said plate, said plate being adapted to rest on top of the necked portion of said can for support of the plate and ring, said plate being tapered downwardly and including closely spaced peripheral drainage openings between the entire periphery of said plate and said ring for flow of fluid downwardly therethrough along the inner surface of said ring below said plate and discharge from the tapered lower edge portion of said ring onto the necked portion of said can in a substantially tubular film enveloping the necked portion of the can.

2. A fluid distributing device as defined in claim 1 wherein the upper edge portion of said ring is also crimped radially along its entire periphery to establish an inwardly extending taper thereon.

FRED A. HANSEN.

REFERENCES CITED

The following references are of record in the file of this patent:

UNITED STATES PATENTS

| Number | Name | Date |
| --- | --- | --- |
| 359,261 | Kennen | Mar. 15, 1887 |
| 528,463 | Busch | Oct. 30, 1894 |
| 577,579 | Hubbard | Feb. 23, 1897 |
| 855,371 | White et al. | May 28, 1907 |
| 971,290 | Mansor | Sept. 27, 1910 |
| 1,032,657 | Briggs | July 16, 1912 |
| 1,186,944 | Rice | June 13, 1916 |
| 1,639,857 | Planski | Aug. 23, 1927 |
| 1,679,302 | Foster | July 31, 1928 |
| 2,031,274 | McKay | Feb. 17, 1936 |
| 2,189,146 | Little | Feb. 6, 1940 |
| 2,210,846 | Aghnides | Aug. 6, 1940 |
| 2,256,971 | Chamberlain | Sept. 23, 1941 |
| 2,316,832 | Aghnides | Apr. 20, 1943 |
| 2,394,684 | Haas | Feb. 12, 1946 |
| 2,411,833 | McMahon | Nov. 26, 1946 |